US010372965B2

(12) United States Patent
Suwald

(10) Patent No.: US 10,372,965 B2
(45) Date of Patent: Aug. 6, 2019

(54) FINGERPRINT SENSING SYSTEM

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 29 days.

(21) Appl. No.: 15/190,159

(22) Filed: Jun. 22, 2016

(65) Prior Publication Data
US 2016/0371527 A1 Dec. 22, 2016

(30) Foreign Application Priority Data

Jun. 22, 2015 (EP) .................................. 15173104

(51) Int. Cl.
*G06K 9/20* (2006.01)
*G06K 9/00* (2006.01)

(52) U.S. Cl.
CPC .......... *G06K 9/001* (2013.01); *G06K 9/0002* (2013.01); *G06K 9/0008* (2013.01)

(58) Field of Classification Search
CPC .................................................. G06K 9/0002
See application file for complete search history.

(56) References Cited

U.S. PATENT DOCUMENTS

| | | | | |
|---|---|---|---|---|
| 5,325,442 A * | 6/1994 | Knapp | ................... | G01B 7/034 361/278 |
| 6,175,641 B1 | 1/2001 | Kalló et al. | | |
| 8,953,853 B2 * | 2/2015 | Alameh | ............. | G06K 9/00026 382/124 |
| 9,898,695 B2 | 2/2018 | Suwald | | |
| 2003/0016297 A1 | 1/2003 | Shigeta | | |
| 2003/0039382 A1 | 2/2003 | Yau et al. | | |
| 2003/0099380 A1 * | 5/2003 | Gozzini | ............... | G06K 9/0002 382/124 |
| 2005/0141263 A1 | 6/2005 | Umeda et al. | | |
| 2008/0317300 A1 | 12/2008 | Pai et al. | | |
| 2009/0067684 A1 | 3/2009 | Mainguet | | |
| 2009/0201128 A1 * | 8/2009 | Campisi | ............. | G06K 9/00006 340/5.53 |
| 2012/0275669 A1 | 11/2012 | Kim | | |
| 2014/0140588 A1 | 5/2014 | Chou | | |

(Continued)

FOREIGN PATENT DOCUMENTS

| EP | 0 457 398 A2 | 11/1991 |
|---|---|---|
| EP | 0942259 A1 | 9/1999 |

(Continued)

OTHER PUBLICATIONS

Tartagni, M. et al. "A Fingerprint Sensor Based on the Feedback Capacitive Sensing Scheme", IEEE Journal of Solid-State Circuits, vol. 33, No. 1, pp. 133-142 (Jan. 1, 1998).

*Primary Examiner* — Brian Werner

(57) ABSTRACT

It is described an arrangement (560, 660, 760) for fingerprint sensing/verification, comprising: a sensor system (100) comprising plural sensor capacitors (101), each sensor capacitor including a central electrode (103) and a peripheral electrode (105) annularly surrounding the central electrode and being connected to a ground potential; wherein changes of the electric fields between each of the central electrode and the peripheral electrode of the plural sensor capacitors upon positioning a finger (317) close to the sensor system is used to detect the fingerprint.

10 Claims, 9 Drawing Sheets

(56) References Cited

U.S. PATENT DOCUMENTS

2014/0333328 A1 11/2014 Nelson et al.
2016/0275333 A1* 9/2016 Lin .................... G06K 9/0002
2017/0337417 A1* 11/2017 Lowe ................ G06K 9/00087

FOREIGN PATENT DOCUMENTS

| EP | 2 650 823 A2 | 10/2013 |
|----|---|---|
| EP | 2 772 837 A1 | 9/2014 |
| JP | 2006-92428 | 4/2006 |
| WO | 2005/124659 A1 | 12/2005 |
| WO | 2014/068090 A1 | 5/2014 |

* cited by examiner

FINGERPRINT SENSING SYSTEM

CROSS-REFERENCE TO RELATED APPLICATIONS

This application claims the priority under 35 U.S.C. § 119 of European patent application no. 15173104.9, filed on Jun. 22, 2015, the contents of which are incorporated by reference herein.

FIELD OF THE INVENTION

The present invention relates to an arrangement for fingerprint sensing, in particular fingerprint verification or authentication, to a transponder including the fingerprint verification system and to a method of fingerprint sensing.

In particular, the invention relates to a smartcard, specifically to the integration of a capacitive fingerprint sensing interface that enables the entry of user verification information into a smartcard, and moreover, to manufacturing of such fingerprint verification devices.

BACKGROUND OF THE INVENTION

In developing world regions like the African continent there is a demand for biometric payment verification. Smartcard holders in such regions are not used to memorizing a PIN code. As these regions are still in the process of development, the budget being available for biometric verification tokens and infrastructure is limited. The currently available smartcard infrastructure is contact-based and the card readers do not reliably allow capturing a fingerprint image through the surface of a smartcard when the smartcard is inserted into a reading device, because the whole card surface is covered by the reader and access to the card surface is not feasible while the reader communicates with the smartcard.

Consequently, there is a desire to provide an affordable biometric verification token operating in a contactless and battery-less mode and that is compatible with existing smartcard infrastructure.

Three main problems have been identified with currently available solutions: Power consumption, cost and verification speed.

A limiting factor in power consumption is the fingerprint scanning device itself. Actual capacitive fingerprint sensors perform full area scan of a human fingerprint causing too high integral power consumption.

Another limiting factor in device cost is the requirement for sufficiently large memory to cache the scanned data for later processing. From a cost perspective it is required to reduce the amount of scanned data in order to be able to reduce the required cache memory size.

A further limiting factor is verification speed. Processing the data of a complete area scan requires a computing device that may provide sufficient computational power expressed in MIPS. A majority of the processing time is currently wasted on scan areas that do not contribute to the finally extracted fingerprint features. It is a desire to reduce the required amount of data in order to be able to run the image processing faster.

It may be conventionally known to use a capacitive sensor array in order to detect a fingerprint of a user. Thereby, the human skin conventionally acts as a counterelectrode. The conventional capacitive sensor array requires a surrounding or external metal ring (bezel). Furthermore, according to the conventional capacitive sensor system, the electrodes for which the human skin acts as a counterelectrode are conventionally connected to a ground potential.

It has been observed that the conventional fingerprint sensing system requires particular constructive features which are difficult to implement in particular in mobile devices, such as a smartphone, a smartcard or the like. Furthermore, the conventional systems may require extensive amounts of energy hampering the use of such systems in portable or mobile devices.

Thus, there may be a need for a fingerprint sensing arrangement, in particular fingerprint verification system, for a transponder comprising such a fingerprint verification system and for a method of fingerprint sensing, in particular fingerprint verification, wherein at least some of aforementioned disadvantages are reduced.

In order to meet the above need, an arrangement for fingerprint sensing, in particular fingerprint verification, a transponder including the fingerprint sensing arrangement and a method for fingerprint sensing are provided, as specified by the independent claims. The dependent claims specify particular embodiments of the present invention.

OBJECT AND SUMMARY OF THE INVENTION

According to an embodiment of the present invention it is provided an arrangement for fingerprint sensing (verification/authentication) comprising a sensor system comprising plural sensor capacitors (e.g. arranged in a two-dimensional array in a plane), each sensor capacitor including a central electrode and a peripheral electrode annularly surrounding the central electrode and being connected to a ground potential; wherein changes of the electric (stray) fields between each of the central electrode and the peripheral electrode of the plural sensor capacitors upon positioning a finger close to the sensor system is used to detect the fingerprint (a topography of the finger).

The arrangement may be integrated or used in a mobile device, such as a smartphone, a laptop computer, a tablet computer, or in particular in a transponder, further in particular in a smartcard.

The central electrode (manufactured from an electrically conductive material) of each of the sensor capacitors is completely surrounded, in particular in a plane, by the respective peripheral electrode (also manufactured from electrically conductive material). During operation or in particular during particular operational steps, an electric voltage may be applied between the respective central electrode and the respective peripheral electrode. Due to the geometry of the central electrode, the peripheral electrode and material between the central electrode and the peripheral electrode, each sensor capacitor may have a particular native capacitance. The charge stored on a particular sensor capacitor depends on the voltage between the central electrode and the peripheral electrode as well as on the capacitance of the sensor capacitor. The capacitance of the sensor capacitor may mainly consist of stray field capacitance and may be influenced and changed by a finger approaching the central electrode and the peripheral electrode. In particular, the finger, in particular the topology of the finger, being placed on or close to the sensor system may influence the sum of the direct electric field and the electric stray field between the respective central electrodes and the respective peripheral electrodes, thereby changing the capacitance such that the capacitance is different from the native capacitance observed when no finger is placed close to the sensor system. A change of the electric field between the central electrode and the peripheral electrode of each of the sensor capacitors may be associated with a change of the capacitance of the respective sensor capacitor. The fingerprint may exhibit portions with elevated areas (ridges) and other portions with non-elevated areas (valleys). The change of the capacitance may include information regarding the topology of the finger being placed close to the sensor system and thus being indicative of the presence of an elevated or non-elevated part of the fingerprint and thus in total being indicative of the image of the fingerprint of the finger.

The capacitance may be measured or read out in a number of ways. The capacitance may for example be converted into a voltage signal being proportional to the capacitance or being proportional to the change of the capacitance with respect to the native capacitance. For building the fingerprint sensing or verification arrangement, a metal ring (bezel) surrounding the sensor system may not be required any more. To operate sensor system may not require extensive amount of energy such that it may be operated in a mobile device, in particular a device having no internal energy supply but being powered by an external field, such as RF field.

In general, the peripheral electrodes may be separated from each other or may be electrically connected to each other. Thereby, manufacturing the fingerprint sensing or verification system may be simplified.

According to an embodiment of the present invention, the central electrode has a rectangular, in particular quadratic shape, wherein in particular a change of the electric field changes a capacity of the respective sensor capacitor.

Thereby, the central electrode may be easily manufactured. The respective peripheral electrode may comprise an inner edge which shape may resemble the shape of the outer edge (in particular rectangular, quadratic) of the central electrode. E.g. conductive material may selectively be applied to a non-conductive substrate or material thereby forming a ring manufactured from electrically non-conductive material separating the central electrode from the peripheral electrode. The separating ring may have a width which is constant along a circumference of the central electrode.

According to an embodiment of the present invention, the central electrode and/or the peripheral electrode comprises at least one recess and at least one protrusion being arranged such that the protrusion of one electrode extends into the recess of the respective other electrode.

The peripheral electrode and the central electrode may be formed in a plane. A recess may be considered to represent a concave portion of the respective electrode and a protrusion may be considered to represent a convex portion of the respective electrode. Thus, a convex portion of one of the electrodes may extend into a concave portion of the respective other electrode. The circumference of an electrode may be defined as the sum of the lengths of edges of the respective electrode, the edges being opposite or adjacent to respective edges of the respective other electrode. The circumference of the central electrode may for example be defined as the sum of the lengths of the outer edges of the central electrode. The circumference of the peripheral electrode may be defined as the sum of the lengths of the inner edges of the peripheral electrode. The greater the circumference of the electrodes, the larger the respective native capacitance may be. The sensor sensitivity may be the larger the larger the sensor native capacitance is. Thus, by providing the electrodes with at least one recess and with at least one protrusion, the circumference(s) may increase and thus the sensor sensitivity may be increased.

According to an embodiment of the present invention, the fingerprint verification or sensing arrangement further comprises a readout system adapted to selectively generate an output signal indicative of a capacity of each of the plural sensor capacitors.

The readout system may be configured or constructed in a number of ways. The readout system may be configured to read out exactly one of the plural sensor capacitors or for example concurrently read out a group of the (adjacent) plural sensor capacitors. The output signal may for example be converted into a numerical signal by an analog-to-digital converter. Plural output signals corresponding to the changes of capacitances of the plural sensor capacitors may be utilized to generate an image of the fingerprint. Such images may be stored in an electronic storage.

The readout system may further comprise a capacitance-to-voltage converter adapted to convert a capacity of each of the plural sensor capacitors to a voltage being proportional to the capacity. A voltage signal may easily be further processed by downstream processing equipment. In particular embodiments, the voltage may not necessarily be proportional to the capacity but the voltage may increase when the capacity increases. In other embodiments a non-linear relationship between the sensor capacitance may be established by means of an analog-to-digital converter having a non-linear relationship between input voltage and numerical output value.

Table 1 below illustrates an example of a non-linear conversion function, wherein in the first column the input voltage is indicated, in the second column decimal output is indicated and in the third column the binary output is indicated. As can be observed from Table 1, when the input voltage increases by factor of 2 the decimal output increases by 1. It may be beneficial to select the first quantization step to be slightly above the noise-level of the system. Furthermore it may be beneficial to increase the quantization step by factor of 2 as this may result in fast numerical conversion from logarithmic representation to linear representation by involvement of binary shift operations.

TABLE 1

| Input Voltage | Decimal Output | Binary Output |
| --- | --- | --- |
| 0.000 V | 0 | 000b |
| 0.020 V | 1 | 001b |
| 0.040 V | 2 | 010b |
| 0.080 V | 3 | 011b |
| 0.160 V | 4 | 100b |
| 0.320 V | 5 | 101b |
| 0.640 V | 6 | 110b |
| 1.280 V | 7 | 111b |

In case the non-linear relationship is logarithmic it may result in a data-compression that requires less data-bits to be stored for the representation of a voltage level (capacitance value) than in the case of a linear conversion relationship. This behaviour may result in saving of data memory space which directly translates into cost saving. In one embodiment up to 7 logarithmic quantization levels may be utilized to convert an input voltage into a 3-bit digital representation, thus providing a resolution of a least-significant bit being similar to that of a linear quantization with 8 bits.

According to an embodiment of the present invention, the capacitance-to-voltage converter comprises an operational amplifier, in particular operational transconductance amplifier, having its non-inverting input terminal connected to ground potential or reference potential, wherein each of the sensor capacitors is selectively connectable to an inverting input terminal of the operational amplifier, a readout capacitor connected between the inverting input terminal of the operational amplifier and an output terminal of the operational amplifier, and a switching system adapted to selectively, in particular successively, convert the capacity of one or more of the plural sensor capacitors to a respective voltage at the output terminal of the operational amplifier.

The operational amplifier may be a conventional operational amplifier. The operational amplifier may have a non-converting input terminal, an inverting input terminal and an output terminal. The readout capacitor may have a same or a capacitance different from the native capacitances of the sensor capacitors. The readout capacitor may therefore be connected in a feedback path between the output terminal of the operational amplifier and the inverting terminal of the operational amplifier. The switching system may comprise a number of switches (for example one switch or two switches for each of the sensor capacitors; one switch for each row of the plural sensor capacitors; one switch being connected in parallel to the readout capacitor and one switch connected between the output terminal of the operational amplifier and the sample capacitor). According to one embodiment the switches being connected to the sensor may be controlled by a shift register being loaded with a digital pattern that may be shifted through the register thereby controlling said switches without a need to provide dedicated column and row address lines.

According to an embodiment of the present invention, the switching system is adapted, in order to readout a particular sensor capacitor, while the finger is close to the sensor system: to discharge the readout capacitor, to connect the central electrode of the particular sensor capacitor to the inverting input terminal of the operation amplifier, until the voltage at the inverting input terminal is at the electric potential being present at the non-inverting input, in which case the output voltage at the output terminal of the operational amplifier is indicative of the capacitance of the particular sensor capacitor and thus indicative of the fingerprint topology in an area placed close to the particular sensor capacitor.

The switching system is in particular further adapted, to either charge the particular sensor by connecting it to a reference voltage before connecting the central electrode of the particular sensor capacitor to the inverting input terminal of the operation amplifier or to charge at least one parasitic capacitor with which a charge sharing occurs while connecting the central electrode of the particular sensor capacitor to the inverting input terminal of the operation amplifier.

Thereby, two different configurations of the switching system are provided. In one of these configurations (type A), a respective sensor capacitor to be read out is firstly charged to a reference voltage. Then, a charge sharing between the particular sensor capacitor to be read out and at least one parasitic capacitor occurs. The charge sharing depends on the (changed) capacity of the respective sensor capacitor, the change of the capacity being caused by the presence of the finger close to the respective sensor capacitor.

In the other configuration (type B), the sensor capacitor to be measured is not charged but nevertheless a charge sharing occurs with at least one parasitic capacitor which has previously been charged. Also in this case, the charge sharing depends on the topology of the finger close to the respective sensor capacitor to be measured. Other configurations of the switching system or the readout system are possible.

According to an embodiment of the present invention, the capacitance-to-voltage converter further comprises a sample capacitor, connectable to the output terminal of the operational amplifier to sample an output voltage of the readout capacitor, in particular further comprising an analog-to-digital converter for converting the voltage of the sample capacitor to a numerical value, wherein the reference voltage and/or the capacity of the readout capacitor is in particular computer controllable.

In particular, a switch may be provided between the output terminal of the operational amplifier and the sample capacitor. The switch may shortly be closed in order to sample the output signal of the operational amplifier to the sample capacitor.

Changing the capacity of the readout capacitor may allow changing the sensitivity of the system. The same may hold for changing the reference voltage.

According to an embodiment of the present invention, the arrangement further comprises a sensor system controller being adapted to control the sensor system, in order to detect fingerprint features in an overview area of the finger at a low resolution, to identify, in the overview area, detail-rich sub areas, in particular including at least one ridge ending and/or ridge island and/or ridge bifurcation and/or ridge crossing, to detect fingerprint features in the sub areas at a high resolution, the sum of the sizes of the sub areas in particular being between 20% and 50% of the size of the overview area.

The sensor system controller may control the switching system in particular by supplying switching signals to plural switches, in particular semiconductor switches, such as MOS-FETs.

The sensor system controller may for example first read out an entire area covered by the sensor capacitors at the low resolution, for example by concurrently reading out 2×2 adjacent sensor capacitors (e.g. by concurrently reading out two sensor capacitors in one row and two sensor capacitors in one column of an array of sensor capacitors). The high resolution may comprise two times or three times or four times as many read outs of sensor capacitors in each of two dimensions as during the low resolution. In another embodiment the voltage being indicative of the sensor capacitance may be quantized in less resolution that may be as low as 1 bit. In this case high resolution sampling may mean sampling with a high amount of quantization steps.

The overview area may cover the entire sensor system sensitive area, i.e. the area covered by the plural sensor capacitors. The fingerprint may be characterized by a shape or a pattern of ridges and valleys. Detail-rich sub areas of the fingerprint may comprise higher frequency contrast or spatial frequency components, such as Fourier components or wavelet components, than detail-sparse sub areas. Detail-rich sub areas may be more suitable for performing a fingerprint authentication or verification than other detail-sparse sub areas. The detail-rich sub areas may be more characteristic for a particular user to be verified or authenticated. Since the overview area is recorded at the low resolution, the amount of storage required to store the low resolution fingerprint representation may be maintained at acceptable limits. Further, since only particular detail-rich sub areas are extracted and recorded at the high resolution, also the size of the sum of the high resolution sub area representation of the fingerprint may not exceed the storage capacity available and require extensive storage. Thus, the arrangement is well suited to be integrated in devices having limited storage capability, such as mobile devices, in particular smartcards.

According to an embodiment of the present invention, the arrangement further comprises a storage, in particular included in a secure element, for storing reference fingerprint data representing a fingerprint of an authorized user, in particular being obtained using the sensor system, a comparator, in particular included in a secure element, being adapted to compare the fingerprint features in at least one sub area against the reference fingerprint data, and an indicator to indicate a result of the comparing.

Thereby, the fingerprint sensing arrangement may easily be adapted as a fingerprint verification or authentication system. A fingerprint recorded from an unknown user may be compared and matched with a reference fingerprint representation stored within the storage. The comparator may perform particular image processing functions. The comparison may for example comprise calculation of a correlation function, rotating one of the images or sub areas to be compared and the like. In particular, the reference fingerprint data may have been acquired using exactly the same fingerprint sensing system which is used to acquire the fingerprint representation of an unknown user. By using one and the same sensor system to acquire the reference data as well as the live data, a verification or authentication accuracy may be increased.

The indicator may for example comprise an LED or a textual output on a screen. Furthermore, the result of the comparing may be transmitted to an external device, such as a card reader, either contact-based or contactless card reader, for example during a payment transaction.

According to an embodiment of the present invention, the identifying of the detail-rich sub areas comprises converting the low resolution representation into a frequency/wavelet domain, in particular calculating a Haar wavelet transform and analyzing its frequency content.

In particular the (image) cache may have a capacity of between 16 kB and 128 kB. When the cache is of a relatively low capacity, it may easily be integrated in a mobile device, such as a smartphone or a smartcard.

The Haar wavelet transform has been shown to be suited to characterize an information content of a two-dimensional representation, such as an image of a fingerprint. The Haar wavelet transform may be easily calculatable.

According to an embodiment of the present invention it is provided a transponder, comprising an arrangement for fingerprint verification according to one of the above describe embodiments, wherein the transponder is in particular powered by a reader field, in particular a contactless payment terminal (POS).

The transponder may comprise a communication interface for wirelessly communicating data with a reader device, the communication technology in particular including radio frequency technology. The transponder may be configured as an RFID tag or for example as a smartcard which has additionally a contact-based communication interface.

The transponder may further comprise a secure element comprising storage for storing the reference fingerprint data and other private data. The secure element may be accessed by particular applications of the transponder in a secure manner. Data within the secure element may be encrypted. The secure element may further also comprise encryption keys. Thereby, security of the transponder may be improved.

According to an embodiment of the present invention, the transponder further comprises a power management adapted to power down the secure element while the sensor system is detecting fingerprint features.

The fingerprint sensor system may require a relatively large amount of power. Thereby, powering down, at least temporarily, the secure element may save energy during acquiring a fingerprint representation by operating the sensor system.

It should be understood that features which have individually or in any combination been disclosed, described or employed for an arrangement for fingerprint sensing/verification may also be applied to a method of fingerprint sensing/verification according to an embodiment of the present invention and vice versa.

According to an embodiment of the present invention it is provided a method of fingerprint sensing (verification), comprising using a sensor system comprising plural sensor capacitors (e.g arranged in a plane), each sensor capacitor including a central electrode and a peripheral electrode annularly surrounding the central electrode and being connected to a ground potential, positioning a finger close to the sensor system, thereby changing electric fields between each of the central electrode and the peripheral electrode of the plural sensor capacitors, and (at least indirectly) detecting the changes in the electric fields thereby sensing the fingerprint.

The fingerprint sensing method may be performed by an arrangement for fingerprint sensing which has been described above. The method may for example be a part of an electronic payment method, in particular performed in conjunction or using a reader device or a card reader device.

Embodiments of the invention are now described with reference to the accompanying drawings. The invention is not restricted to the illustrated or described embodiments.

DETAILED DESCRIPTION OF EMBODIMENTS

Figure 1:
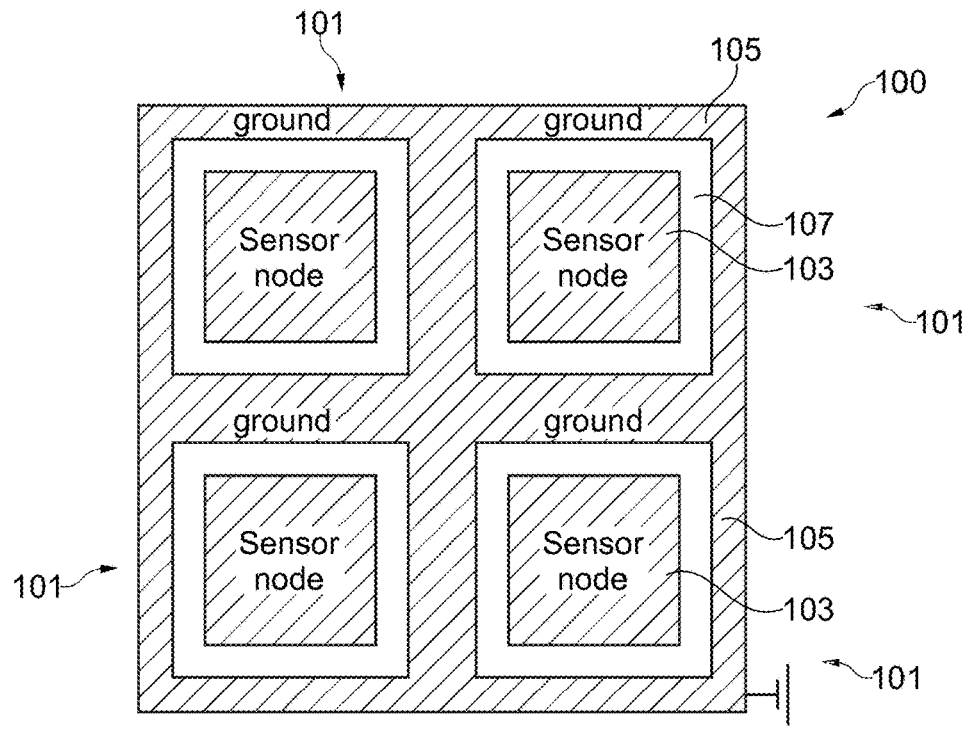
FIG. 1 schematically illustrates a sensor system comprised in an arrangement for fingerprint sensing/verification according to an embodiment of the present invention.

Embodiments of the present invention may achieve advantages using the following features:
- Combined fingerprint scanning and feature extraction is faster and less memory demanding
- Fast switched-capacitor fingerprint sensor with random pixel addressing
- Spatial resolution enhancement by two-dimensional weighted averaging
- Resource sharing between enrolment and verification mode Embodiments of the present invention may comprise the following features:
- Apply on-token fingerprint verification (one-to-one) rather than card-holder identification (one-to-many);
- Provide an integrated fingerprint verification token that may have smartcard format;
- The verification token may comprise
  - An operational transconductance amplifier (OTA) with capacitive feedback network used to implement a fast capacitance-to-voltage converter with the voltage reading being indicative of the measured sensor capacitance
  - The fingerprint sensor device is organized in a matrix configuration with rows and columns and is arranged to enable random access to at least one individual sensor by selection of individual rows and columns
  - Image scanning and feature extraction are no separate processing steps anymore and image scanning is already combined with a pre-extraction of minutiae and ridge-flow features
  - Perform an early data reduction by scanning the fingerprint in two steps:
  - Step 1 is a first raw scan with reduced resolution yielding the positions of potential minutiae areas and areas containing ridge flow information.
  - Step 2 is a series of fine scans at full resolution being applied to the potential minutiae and ridge-flow areas identified by step 1
  - The final minutiae and ridge-flow extraction process is simplified by applying information gathered during enrolment; this step provides the extracted minutiae and ridge-flow information to the matching process
  - The minutia and ridge-flow matching is performed inside the secure processing environment of a secure element
  - The scanning device is specifically designed as an I/O extension for general purpose MCUs, e.g. communicating via a standard SPI interface FIG. 1 illustrates a sensor system 100 including plural capacitors 101 according to an embodiment of the present invention. Each of the sensor capacitors 101 comprises a central electrode 103 and a peripheral electrode 105 that annularly surrounds the central electrode 103 and is connected to a ground potential. The central electrode 103 may have a quadratic form and may extend in a plane spanned by two different directions. The central electrode 103 is electrically separated by the peripheral electrode 105 by a gap 107 (surrounding the central electrode 103) with straight sections having a constant width.

During operation of the sensor system 100, an electric voltage is applied between the central electrode 103 and the peripheral electrode 105, thereby creating an electric field between the two electrodes comprising a direct field component and a stray filed component. Said electric field is disturbed and changed by a finger being placed close to the sensor system 100 in particular in dependence of a topology of the finger, in particular the fingerprint features.

Figure 2:
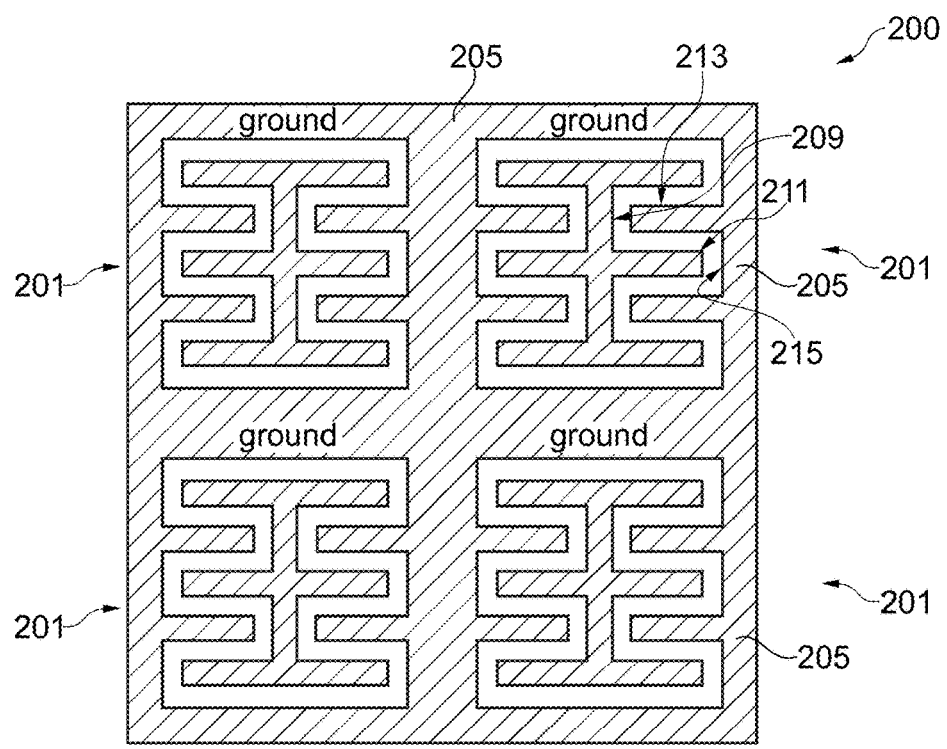
FIG. 2 schematically illustrates a sensor system comprised in an arrangement for fingerprint sensing/verification according to an embodiment of the present invention.

FIG. 2 schematically illustrates a sensor system 200 according to an embodiment of the present invention also including plural sensor capacitors 201, each sensor capacitor comprising a central electrode 203 and a peripheral electrode 205. Different from the embodiment of the sensor system 100 illustrated in FIG. 1, the sensor system 200 illustrated in FIG. 2 comprises plural central electrodes 203 that comprise at least one recess 209 and also a protrusion 211. The peripheral electrode 205 comprises a protrusion 213 extending into the recess 209 of the central electrode 203. In turn, the protrusion 211 of the central electrode 203 extends into and thereby interdigitates with the recess 215 of the peripheral electrode. Thereby, an interdigitated arrangement between the central electrode and the peripheral electrode 205 is formed. By the particular shape of the central electrode 203 and the peripheral electrode 205 comprising convex and concave sections or portions, a native capacity of the sensor capacitor 201 can be increased relative to the native capacity of the sensor capacitor 101 of the sensor system 100 illustrated in FIG. 1. Thereby, a sensor sensitivity may be increased.

An exemplary (simplified) capacitive sensor array with 2 rows and 2 columns is illustrated in FIGS. 1 and 2. In a practical embodiment the sensor matrix may have a dimension of 192×192 sensors covering an area of 10 mm×10 mm. The pitch between two sensor nodes may be e.g. 52 um in both dimensions.

The sensor as illustrated in FIG. 1 has not been optimized for maximum sensor capacitance. Since sensor capacitance translates into sensor sensitivity it may be required to enlarge the sensor capacitance.

The sensor node capacitor may be improved by utilizing an interdigitated structure as indicated in FIG. 2 which provides a better area utilization.

Figure 3:
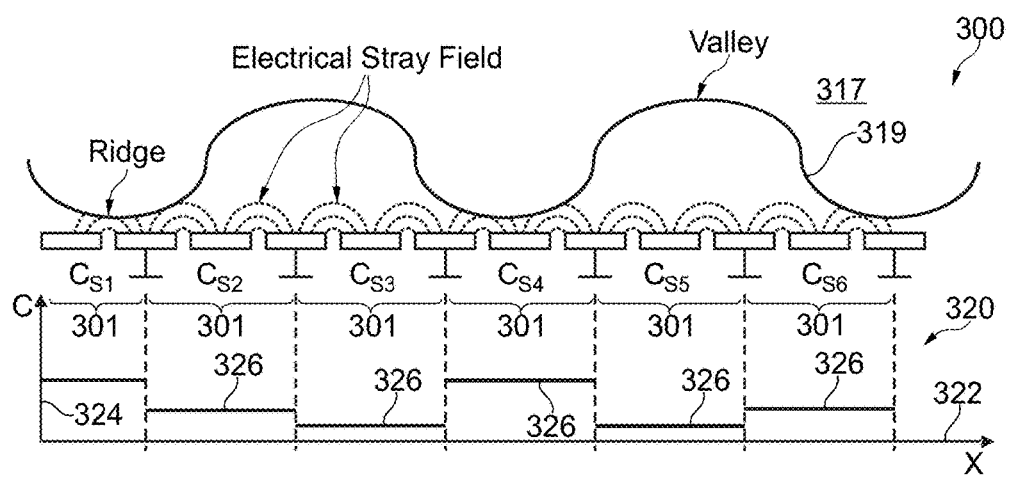
FIG. 3 schematically illustrates in a cross-sectional side view principles of a sensor system for sensing a fingerprint as used in embodiments according to the present invention.

FIG. 3 illustrates in a cross-sectional side view an embodiment of a sensor system according to an embodiment of the present invention.

Thereby, a finger 317 having a limiting border or topology 319 is placed close to the sensor system 300 comprising the plural sensor capacitors 301.

The graph 320 having an abscissa 322 indicating a position in the x-direction and having an ordinate 324 representing the capacitor illustrates how the capacity 326 of the plural sensor capacitors 301 is changed in dependence of the topology of the limiting border 319 of the finger 317.

An attached finger 317 may affect the electrical stray field that develops between the sensor nodes $Cs1 \ldots Cs6$ and the surrounding ground electrodes, thus changing the sensor capacitance. The capacitances measured along the x-dimension are illustrated in Graph 320 in FIG. 3. The width of the gap between the central electrode and the surrounding ground electrode determines the vertical resolution of the sensor. The sensor layout indicated by FIG. 3 is only schematic and the final dimensions like widths and gaps have to follow the vertical resolution requirements.

Figure 4:
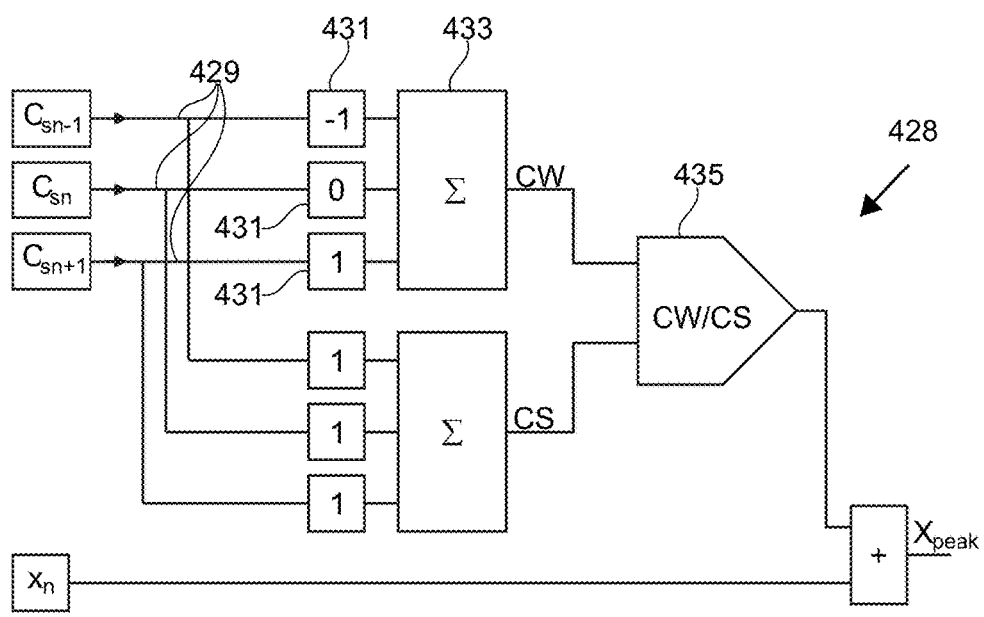
FIG. 4 schematically illustrates an averaging methodology for processing sensor signals as generated by a sensor system according to an embodiment of the present invention.

FIG. 4 schematically illustrates a weighted averaging which may be comprised within an arrangement for fingerprint sensing/verification according to an embodiment of the present invention. The weighted averaging scheme 428 receives capacity values $C_{sn-1}$, $C_{sn}$, and $C_{sn+1}$ representing capacities of different sensor capacitors of a sensor system according to an embodiment of the present invention. The sensor signals 429 may be multiplied by the factor –1, 0 and 1 using the multiplication elements 431 and may be summed using the summation element 433. A ratio between CW/CS is then obtained by the element 435. The output is added to the position $x_n$ of the sensor capacitor in order to derive the quantity $x_{peak}$.

In one embodiment the peak of a ridge may be obtained from a filter operation as indicated in FIG. 4. From three neighboured samples with known x-position the x-position of the ridge peak may be obtained by a weighted averaging operation. This weighted averaging filter may be applied to obtain a more precise peak position without increasing the spatial resolution of the sensor array or without increasing the numerical resolution of one sensor capacitor.

In a further embodiment the principle of weighted averaging may be applied in X- and Y-dimension as well.

Figure 5:
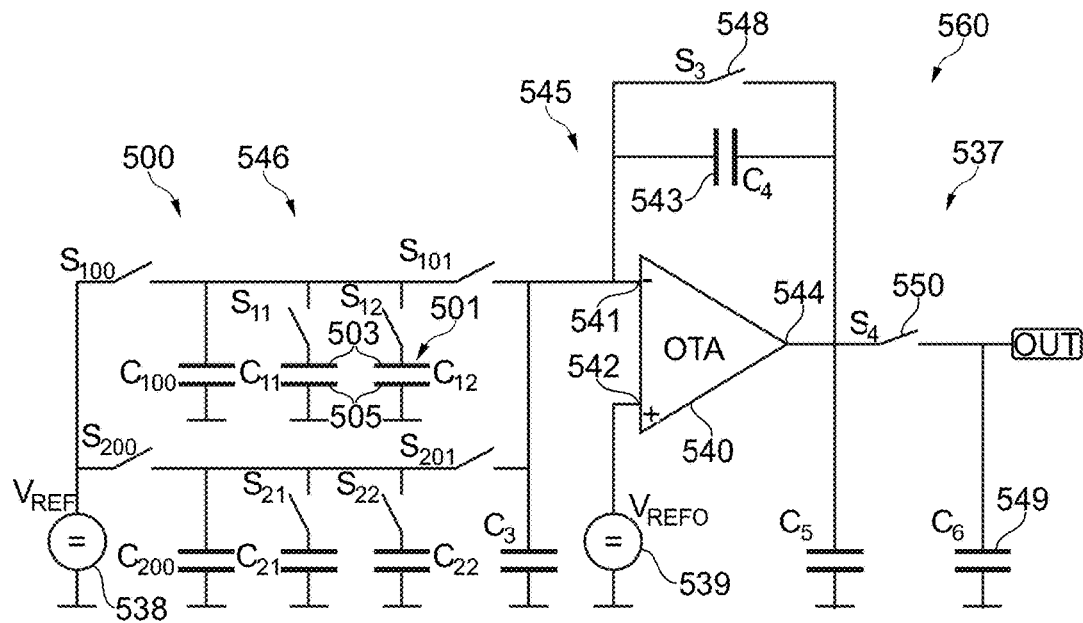
FIG. 5 schematically illustrates a circuit diagram of an arrangement for fingerprint sensing/verification including a readout system according to an embodiment of the present invention.

FIG. 5 schematically illustrates a fingerprint sensor arrangement 560 including a circuit diagram of a readout system 537 according to an embodiment of the present invention. As in the sensor systems 100 and 200 illustrated in FIGS. 1 and 2, the readout system 537 is adapted to capture capacity values of exemplary form sensor capacitors 501 labelled $C_{11}$, $C_{12}$, $C_{21}$ and $C_{22}$. A voltage source 538 generates a reference voltage $V_{REF}$ and another voltage source 539 generates a further reference voltage $V_{REF0}$.

The readout system 537 comprises an operational amplifier (OTA) 540 having an inverting input terminal 541 and a non-inverting input terminal 542. The central electrode 503 of the capacitor 501 is connectable by a respective switch $S_{11}$, $S_{12}$, $S_{21}$, $S_{22}$ to the inverting input terminal 541 of the operational amplifier 540. The readout system 537 further comprises a readout capacitor 543 which is connected in a feedback path between an output terminal 544 of the operational amplifier 540 and the inverting input terminal 541 of the operational amplifier 540. A capacitance-to-voltage converter 545 converts a capacitance of one or more of the sensor capacitors 501 to a voltage at the output terminal 544 of the operational amplifier 540. The switching system 546 is adapted to selectively, in particular successfully, convert the capacity of one or more of the plural sensor capacitors 501 to a respective voltage at the output terminal 544 of the operational amplifier 540.

In one embodiment the capacitance of the sensor capacitors may be determined by a switched-capacitor capacitance-to-voltage converter as illustrated in FIG. 5. In this embodiment the sensor device comprises a switched capacitor sensor matrix with capacitors C11 . . . C22 and an OTA configured as inverting amplifier. Under the impact of an attached finger (see FIG. 3) the stray capacitance of the sensing capacitors C11 . . . C22 deviates from its nominal (or native) capacitance value. To measure e.g. the capacitance of sensor capacitor C11 it is charged to the reference voltage Vref by briefly closing switches S11 and S100 while keeping S101 open. When C11 is fully charged switches S100 and S11 are opened again.

The readout phase is prepared by closing switch S3 and row-switch S101 which discharges capacitor C4 and also sets the voltage across C3 and C100 to Vref0 potential (via the OTA in voltage follower mode).

Switch S3 is now opened and switch S11 is closed. The resulting voltage that develops as a result of charge sharing between C11, C100 and C3 at the inverting input of the OTA causes an output sink current through capacitor C4, which is series connected with the paralleled capacitors C3, C100 and C11 until the voltage at the inverting input of the OTA is back at Vref0 potential. As a consequence the output voltage of the OTA is (Vref0–Vref) if the capacitance of C4 is equal to the capacitance of C11. Any capacitance deviation of C11 results in a corresponding variation of the output voltage of the OTA. Hence, the output voltage of the OTA is indicative of the capacitance of C11. When the output voltage of the OTA has settled switch S4 is briefly closed to sample the output voltage of the OTA on capacitor C6. Capacitors C100 and C200 indicate the parasitic capacitance associated with the row read-lines, capacitor C3 indicates the parasitic capacitance being associated to the negative input node of the OTA and capacitor C5 indicates the parasitic capacitance being associated with the output line of the OTA.

The switches S100, S200, S11 . . . S22, S101, S201, S3 and S4 may be controlled by a computer program or by a state-machine in such a way that an individual sensor capacitor or a group of sensor capacitors may be evaluated at one time. The voltage across capacitor C6 may be converted by suitable means into a numerical value for further processing.

In one embodiment numerical processing of the voltage across capacitor C6 may comprise subtraction of voltage Vref0, amplification of the resulting voltage difference and analog-to-digital conversion of the amplified voltage difference.

In one embodiment all sensor capacitors that are not connected to the row that is currently read remain connected to the voltage Vref. The row-switch remains closed. Reading a sensor capacitor comprises closing switch S3, until the row-voltage is reset to Vref0 potential, then opening S3. The sensor capacitor is then connected to the read-rail by closing the related switch, e.g. S11. The voltage change applied to the inverting OTA input will cause OTA to bring the input voltage at the inverting OTA-input back to Vref0 potential. This sequence is repeated for all sensing capacitors in a row.

In one embodiment all components except the sensor capacitors C11 . . . C22 are comprised in a monolithically integrated circuit. Sensor capacitors C11 . . . C22 are implemented by a redistribution layer added on top of the monolithically integrated circuit.

In another embodiment all components including the sensor capacitors C11 . . . C22 are comprised in a monolithically integrated circuit.

In one embodiment the reference voltage Vref is made computer controllable with the purpose to set the system gain. A higher value of Vref will result in a lower voltage for the same capacitance value of a sensor capacitance, a lower value of Vref will result in a higher output voltage.

In one embodiment the controlled reference voltage is provided by the application controller to the sensor device.

In one embodiment capacitor C4 is made computer controllable with the purpose to set the system gain. A higher capacitance value of C4 will result in a less negative output voltage for the same capacitance value of a sensor capacitance while a lower capacitance value of C4 will result in a more negative output voltage.

In one embodiment the number of capacitors in one row is made 192 and the number of rows is also made 192. All first capacitors in each row are controlled by the same control signal all second capacitors in each row are controlled by the same control signal and so forth.

The sensor readout system (Readout System Type A as illustrated in FIG. 5) has the following operating principle:
1. All switches open
2. Close e.g. S100 and e.g. S11, sensor Cap C11 will be charged to Vref
3. Open e.g. S11 and e.g. S100, disconnect row from Vref
4. Close e.g. S101, close S3, close S4, sensor row parasitics C100 and C3 and C5 and C6 will be charged to Vref0 potential
5. Open S3 to prepare readout
6. Close e.g. S11, charge sharing among e.g. C11 and C100 and C3 will appear, resulting in a voltage change on the neg OTA input. OTA will drive current through C4 until OTA input voltage is zero.
7. Open S4 to sample&hold the output voltage on C6, open e.g. S101
8. Convert Vout−Vref0 into a numerical representation by means of e.g. a 4-bit Pipeline ADC A shortcoming of Readout System Type A is a requirement to apply different voltages to the parasitic capacitance of a sensor row (Vref and Vref0). This behavior may result in unwanted supply current due to constant charging/discharging of the parasitic capacitors. Next to that two independent reference voltage supplies are required. It may be also desired, to remove the switches S×00 in order to achieve a less complex readout operation combined with a speed improvement. This behavior may be corrected by the Readout System Type B illustrated in FIG. 6.

Figure 6:
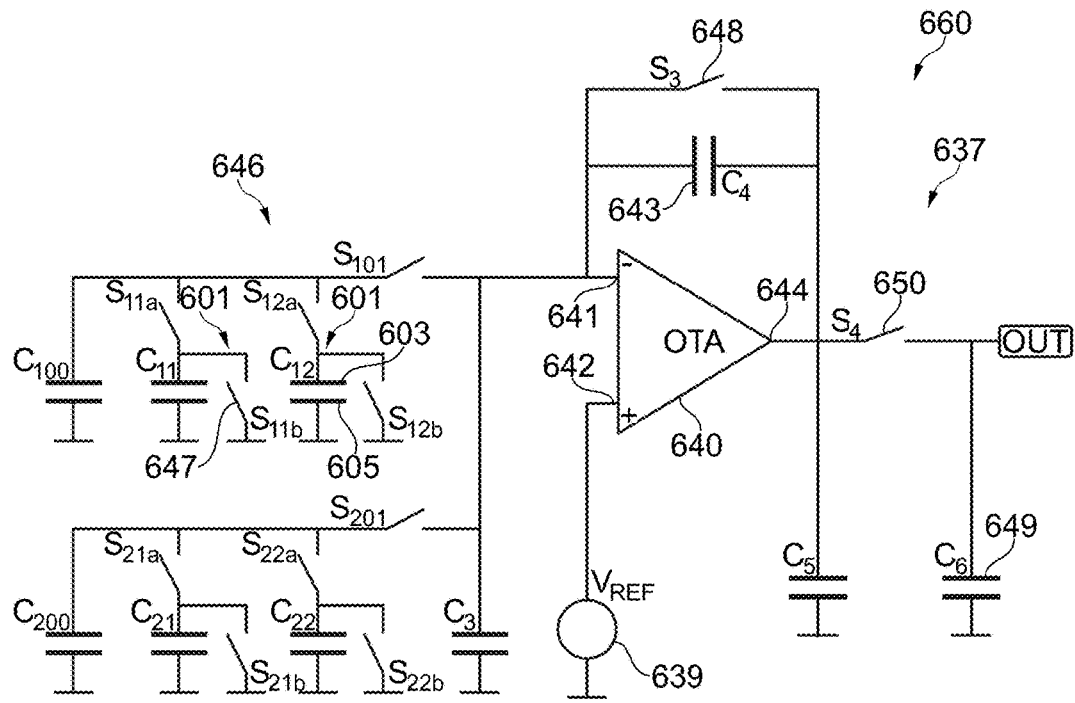
FIG. 6 schematically illustrates a circuit diagram of a readout system comprised in a fingerprint sensing/verification arrangement according to an embodiment of the present invention.

FIG. 6 schematically illustrates another readout system 637 according to an embodiment of the present invention comprised in a fingerprint sensing arrangement 660. Features which are similar in structure and/or function in FIGS. 5 and 6 are labelled with the same reference signs. The readout system 637 has a number of features in common with the readout system 537 illustrated in FIG. 5. Different from the readout system 537 illustrated in FIG. 5, the readout system 637 illustrated in FIG. 6 comprises for each of the sensor capacitors 601 a respective switch 647, enabling to discharge the respective capacitor 601. Common to both systems is the operational transconductance amplifier 640, the readout capacitor 643 and the respective switch 548, 648 being connected between the electrodes of the readout capacitor 643. The sample capacitor 549, 649 may be connected by closing the switch 550, 650 to the output terminal 544, 644 of the operational amplifier 540, 640, in order to sample the voltage value corresponding to the capacity of the measured capacitor. The capacitors $C_{100}$, $C_3$ and $C_5$ represent parasitic capacitors generated by the electric lines, and non-linear parasitic capacitors for example in semiconductor elements.

The readout system 637 illustrated in FIG. 6 requires only one reference voltage source 639, thereby simplifying the system.

Every sensor capacitor 601 has now an individual discharge switch attached that may set an initial condition of zero voltage. The ground potential of the OTA is connected to Vref. Only a single Vref supply is required.

An operating principle is as follows:
1. All switches open to set defined initial conditions
2. Close e.g. S101, close S3, close S4 and the sensor row parasitics C100 and C3 and also the OTA output capacitance C5 and the sample&hold capacitance C6 will be charged to Vref potential, the feedback capacitor C4 will be discharged. At the same time close e.g. S11b, which discharges e.g. C11
3. Open e.g. S11b to end discharge of e.g. C11
4. Open S3 to prepare readout, which configures the OTA as charge amplifier
5. Close e.g. S11a, charge sharing among e.g. C11 and C100 and C3 will appear, resulting in a voltage drop on the neg OTA input. OTA will drive current through C4 until OTA input voltage is zero (=until e.g. C11 is charged to Vref)
6. Open S4 to sample&hold the output voltage on C6, open e.g. S101
7. Convert (Vout−Vref) into a numerical representation by means of e.g. a 4-bit Pipeline ADC Actually in this approach the relatively large capacitance of e.g. C100+C3 is always kept at Vref, just a single sensor charge may be required per pixel cycle. This new behavior improves the step response of the readout circuit while reducing supply current, which is a requirement for the sensor. Discharging the sensor capacitor and resetting the readout system may now be carried out concurrently, which will improve overall speed. Steps 2 and 3 and also steps 4, 5, and 6 may be combined into one step, resulting in a faster conversion time. The steps are just for the purpose of clarity kept separate.

Figure 7:
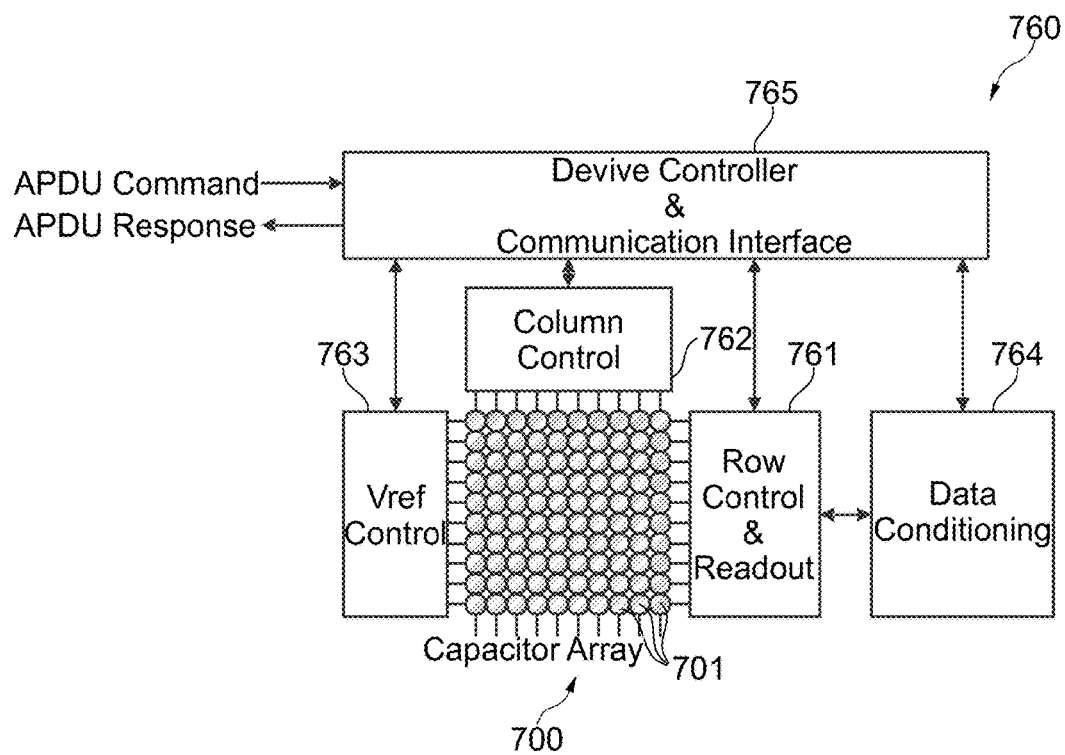
FIG. 7 illustrates a schematic block diagram of an arrangement for fingerprint sensing/verification according to an embodiment of the present invention.

FIG. 7 schematically illustrates a block design of an arrangement for fingerprint sensing/verification 760 according to an embodiment of the present invention. The arrangement 760 for fingerprint sensing/verification comprises the sensor system 700 including the plural sensor capacitors 701. The arrangement 760 for fingerprint sensing/verification comprises a row control module 761 and a column control module 762, as well as a reference voltage control element 763. A data conditioning element 764 receives the voltage values being indicative of (or in particular logarithmic to or proportional to) the measured capacitance values of the plural sensor capacitors 701. A device controller and communication interface 765 connects to an APDU command and response.

The fingerprint sensor may be controlled by an application controller by means of a logical combined command/data-interface (APDU). The Device Controller may separate the received command instruction from attached data, may configure the device and may start the requested image scanning task. As physical interface an SPI-interface may be well suited as it may combine addressing capability with high bandwidth communication capability.

For achieving that task the Device Controller may generate and provide control signals to the Column Control block, the Row Control & Readout block, the Vref Control block (in case readout system type A is applied) and the Data Conditioning Block. The Vref control block may be omitted in case a readout system of type B may be applied. The voltage levels resulting from readout operations may be converted into computer readable data by the Data Conditioning block. It may be advantageous to use a non-linear voltage-to-digital conversion relationship such as a logarithmic relationship as this approach may provide data compression that helps to save memory for storage of the conditioned data. The conditioned data may be returned to the communication controller for returning the conditioned data to the application controller by means of an APDU response.

This device setup supports a minimal amount of interface signals. Furthermore, it supports implementation in a low-cost two-metal-layer-process without a need for special analog process options.

The fingerprint scanning process according to this disclosure is described below in more detail.

Figure 8:
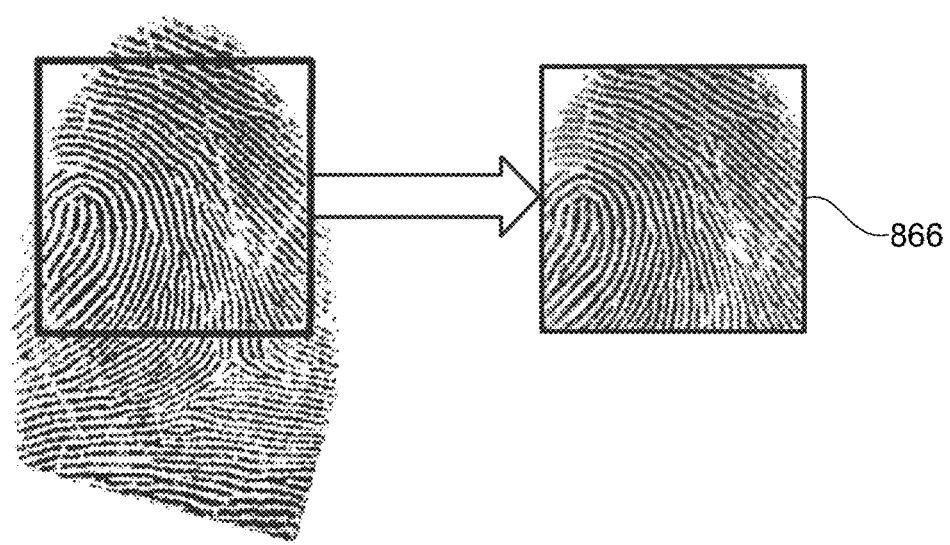
FIGS. 8, 9 and 10 illustrate examples of fingerprint representations acquired during a method for fingerprint sensing/verification according to an embodiment of the present invention.
Figure 9:
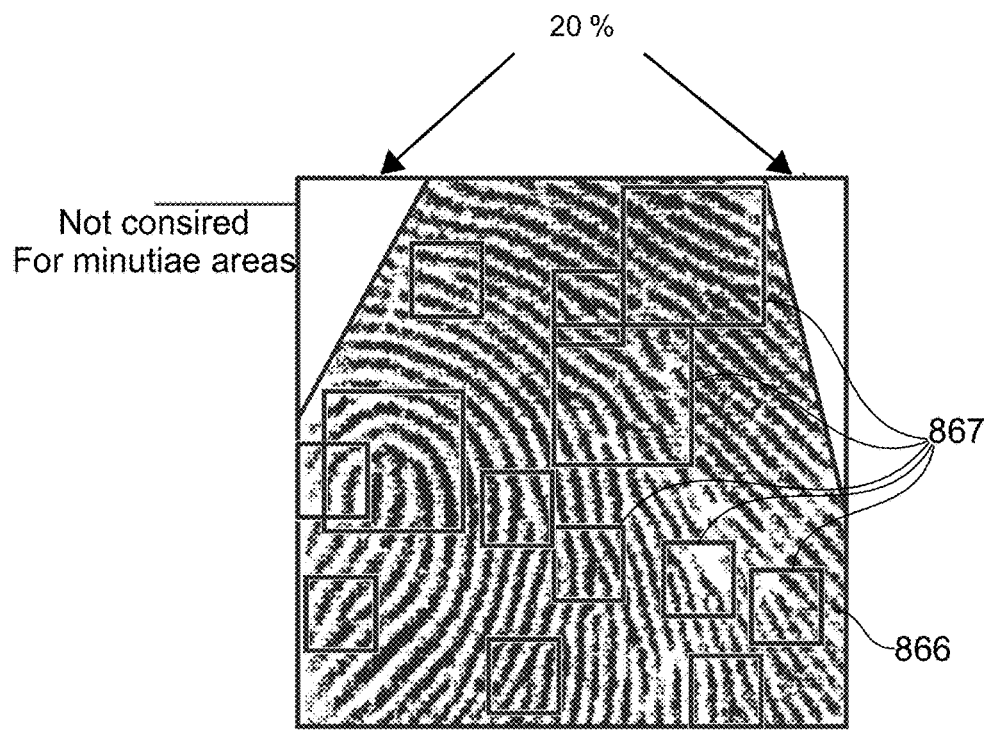
Figure 10:
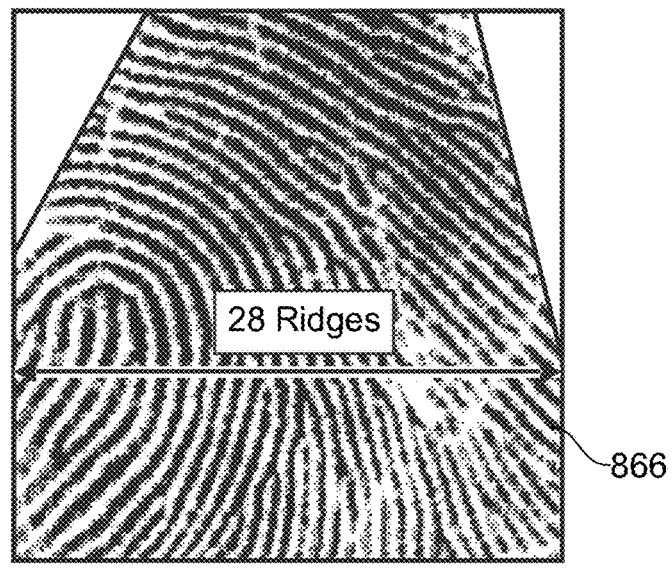

FIGS. 8, 9 and 10 illustrate representations of a fingerprint as captured and processed in method steps according to an embodiment of the present invention. In FIG. 8, a fingertip comprising fingerprint information has been placed on the sensor and the scanning process is started. After the fingertip has been placed on the sensor the scanning process is started. The sensor is capable of taking image samples inside the boundaries of the sensor matrix. In a first step the image is scanned at reduced resolution, that may be achieved by evaluating every other sensor capacitor of every other row at nominal quantization or by evaluating every sensor capacitor at a reduced quantization wherein reduced quantization shall mean at least 1 bit. Image 866 represents a low resolution representation of the fingerprint in an overview area.

FIG. 9 illustrates how detail-rich sub areas 867 are identified within the overview fingerprint representation 866.

The raw scan 866 may be evaluated with the purpose to identify areas without meaningful fingerprint information, e.g. at the top of the fingerprint. About 20% of the scanned area may be skipped due to the form of the fingertip which may normally be narrower at the compared to the bottom. The remaining area may be evaluated for potential areas containing minutiae formations or ridge flow information. Potential minutia areas may comprise endings, islands, bifurcation and crossings as indicated by the boxes 867 in FIG. 9. Potential ridge flow information areas may comprise whorls, arches and loop pattern information.

In one embodiment a wavelet transformation utilizing Haar wavelets is applied to convert the scanned image into the wavelet/frequency domain. Minutiae 867 as indicated by may have higher frequent signal content than the normal ridge/valley signal content.

In FIG. 10, the overview representation 866 is again illustrated showing 28 ridges of a fingerprint.

The fingerprint sample as illustrated by FIG. 10 has a ridge count of 28 in horizontal direction which results in more than 6 samples per ridge valley combination. Sampling at half the maximum sampling frequency may still provide 3 samples per ridge-valley combination and thus may also fulfill the sampling theorem. It may be safeguarded by design that the sampling theorem is still fulfilled for minutiae to be identified.

The sub areas 867 are then recaptured in a high resolution.

Figure 11:
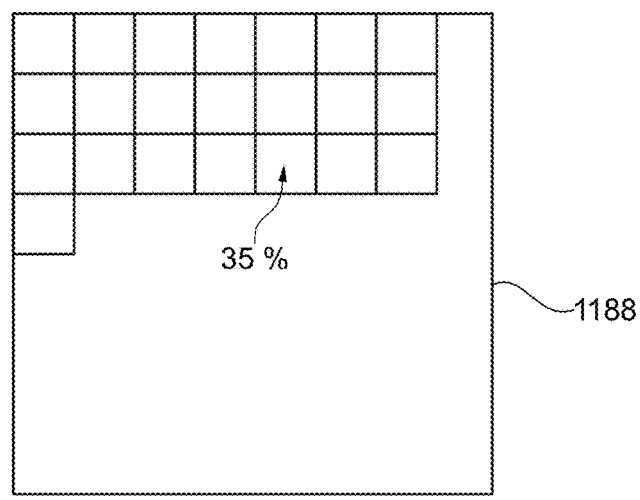
FIG. 11 schematically illustrates a storage usage in a method of fingerprint sensing/verification according to an embodiment of the present invention.

FIG. 11 illustrates the storage usage of the sub areas 867. The minutiae areas as indicated above may comprise as little as 35% of the total available scanning area, resulting in a greatly reduced sample cache memory size and also in a greatly improved scanning speed which may also mean greatly reduced power demand.

The area 1188 represents the storage to capture the whole overview area 866 of the fingerprint representation. As can be appreciated from FIG. 11, only 35% of the storage 1188 to store the entire overview area is utilized, when only the sub areas 867 are further processed and cached.

Figure 12:
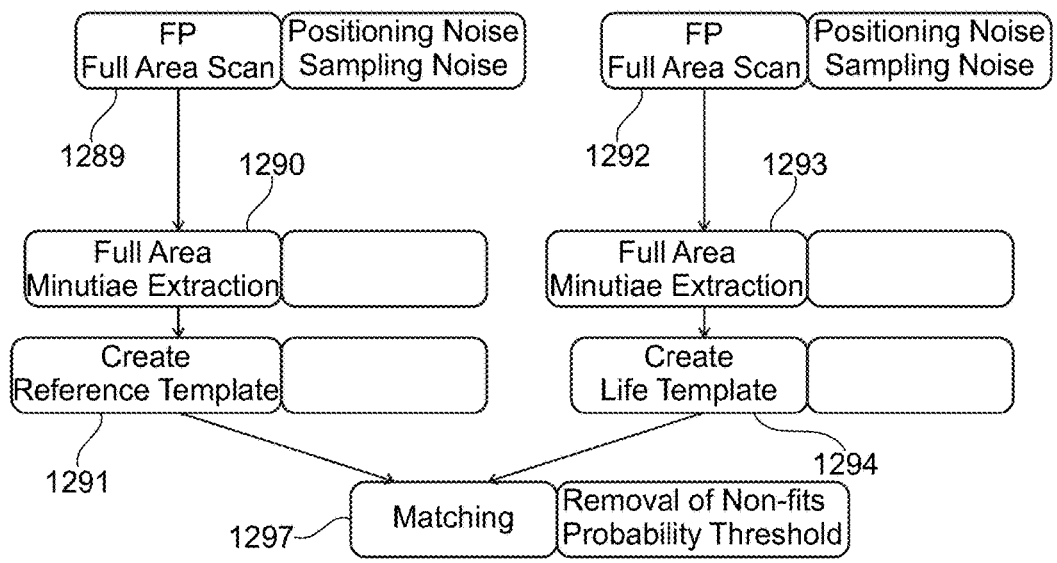
FIG. 12 schematically illustrates method steps of a differential fingerprint processing approach according to an embodiment of the present invention.

FIG. 12 illustrates method steps in a differential fingerprint processing approach according to an embodiment of the present invention.

In the method step 1289, a full area scan is performed, in order to obtain an overview fingerprint representation, such as representation 866 illustrated in FIGS. 8, 9 and 10. In the method step 1290, detail-rich sub areas are identified and extracted. In the method step 1291, a reference template is created from one or more of the sub area regions being captured at a high resolution. In same or corresponding method steps 1292, 1293 and 1294, the same methodology is applied for authenticating or verification of an unknown user. The live template created in method step 1294 is then matched with the reference template created in the method step 1291.

One key feature of this disclosure may be the strictly implemented Differential Sensor Operation. According to this approach the fingerprint verification device itself is used to scan the reference samples required to generate the reference feature template. This approach may simplify the overall system and may reduce sampling requirements. The FIG. 12 indicates errors and system overhead that may be skipped when taking the reference template directly with the sensor embedded into the fingerprint verification device.

Figure 15:
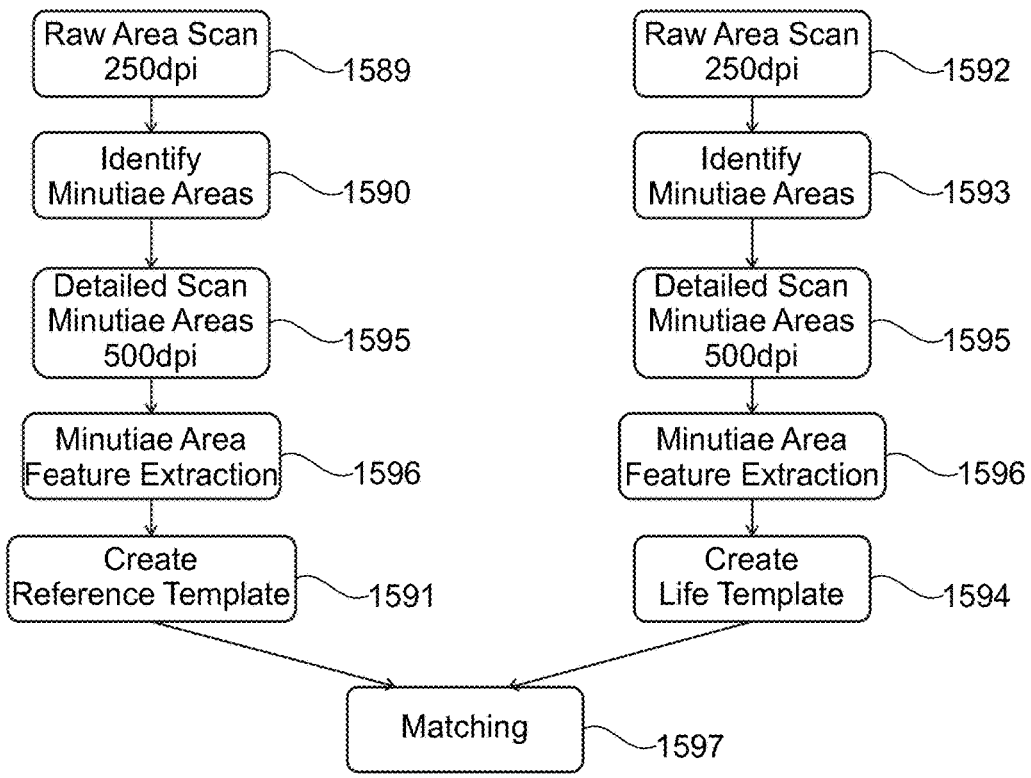
FIG. 15 illustrates method steps during a differential fingerprint processing approach according to an embodiment of the present invention.

The resulting processing sequence for enrolment and verification is indicated by FIG. 15 and describe below.

Figure 13:
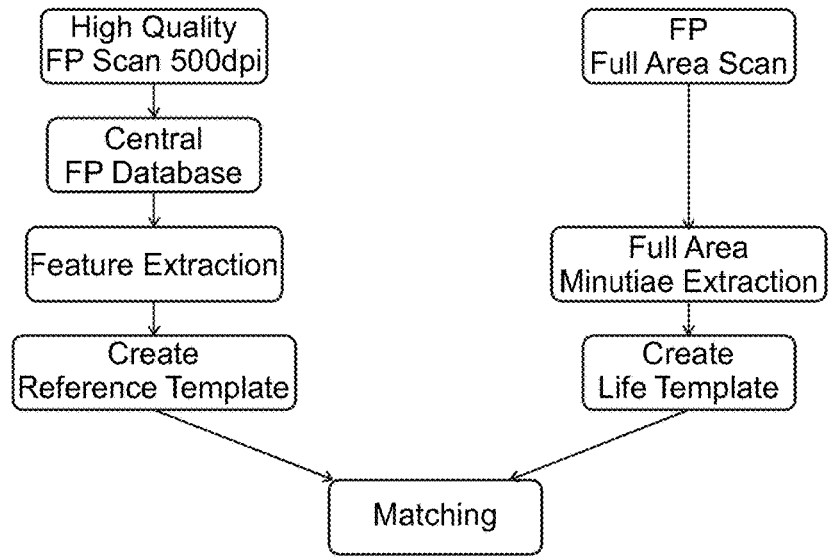
FIGS. 13 and 14 schematically illustrate state-of-the-art fingerprint verification systems including an error analysis.
Figure 14:
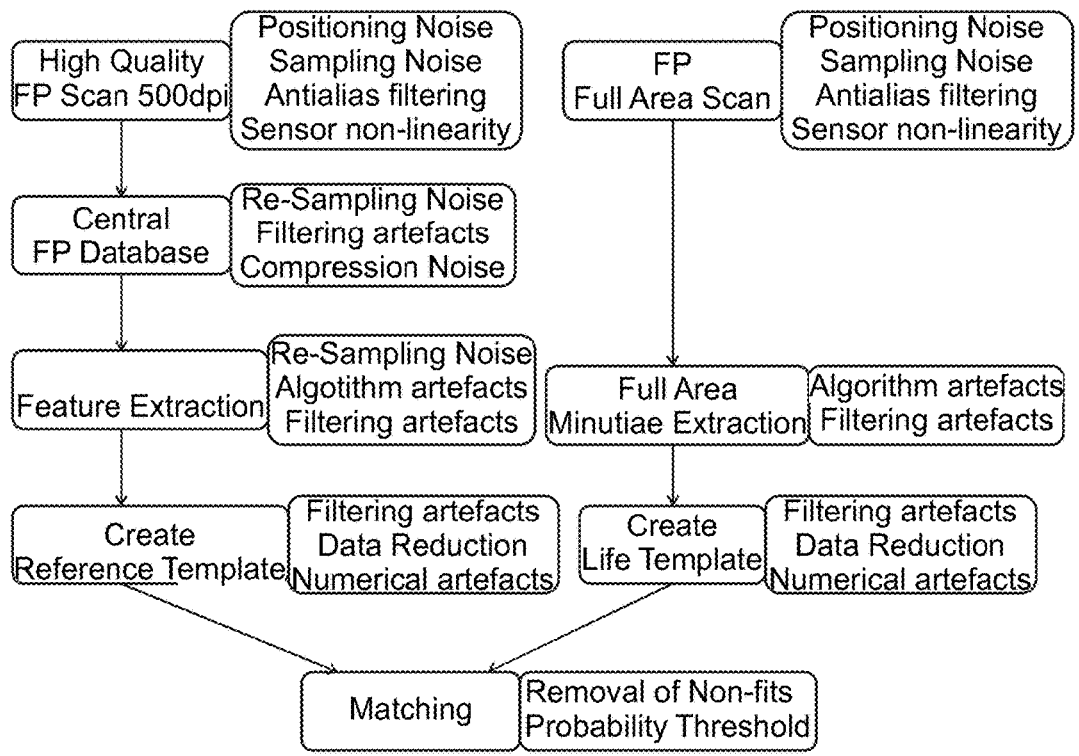

FIGS. 13 and 14 illustrate a methodology according to the state-of-the-art.

In conventional fingerprint applications as indicated by FIG. 13 enrolment is not done on the device sensor but on a separate sensor that may deviate in terms of design, linearity and image resolution. Compensation by additional image processing is required to enable proper matching. Moreover, setting up and maintaining a central fingerprint database is not desired, as for different applications different fingerprint data bases may exist that are difficult to control in terms data security.

An error analysis of a state-of-the-art fingerprint system according to FIG. 13 is illustrated in FIG. 14. Due to the error analysis given above a high sampling precision is required during enrolment and also during life sample capturing. Storing the reference samples in a data base causes a huge data conversion, resampling and filtering overhead, that also defines strict requirements for the life sample acquisition. These requirements make the fingerprint verification system more complex, more power demanding and more expensive. It is currently not feasible to integrate such system into a low-cost contactless smartcard.

FIG. 15 illustrates in more detail method steps during a differential fingerprint processing approach according to an embodiment of the present invention.

The method of fingerprint sensing/verification comprises similar or even identical method steps during creation of a reference template and creation of a live template. Namely, during the method step 1589 and 1592, an overview scan is captured at a low resolution of 250 dpi. In the further method steps 1590 and 1593, detail-rich areas are identified and extracted, regarding their positioning. In the method steps 1595, the sub areas, such as sub areas 867 illustrated in FIG. 9, are recaptured at a higher resolution, for example 500 dpi. Features at the sub areas are extracted in the method steps 1596, thereby for example performing a wavelet transform. Finally, the reference template is created in the method step 1291 and the live template is created in the method step 1294. The reference template and the live template are finally matched in the method step 1597.

The benefit of the approach according to FIG. 15 is that the processing components used for reference sample generation and life sample generation can be made the same, thus reducing the required software footprint which has a positive impact on device cost.

In one embodiment extraction hints are linked to the minutiae reference templates with the purpose to give guidance for the life sample extraction process. These hints may include e.g. the main direction of the direction field inside a potential minutiae area or the expected ridge count, which may support faster minutiae extraction without compromising security or minutiae entropy.

Figure 16:
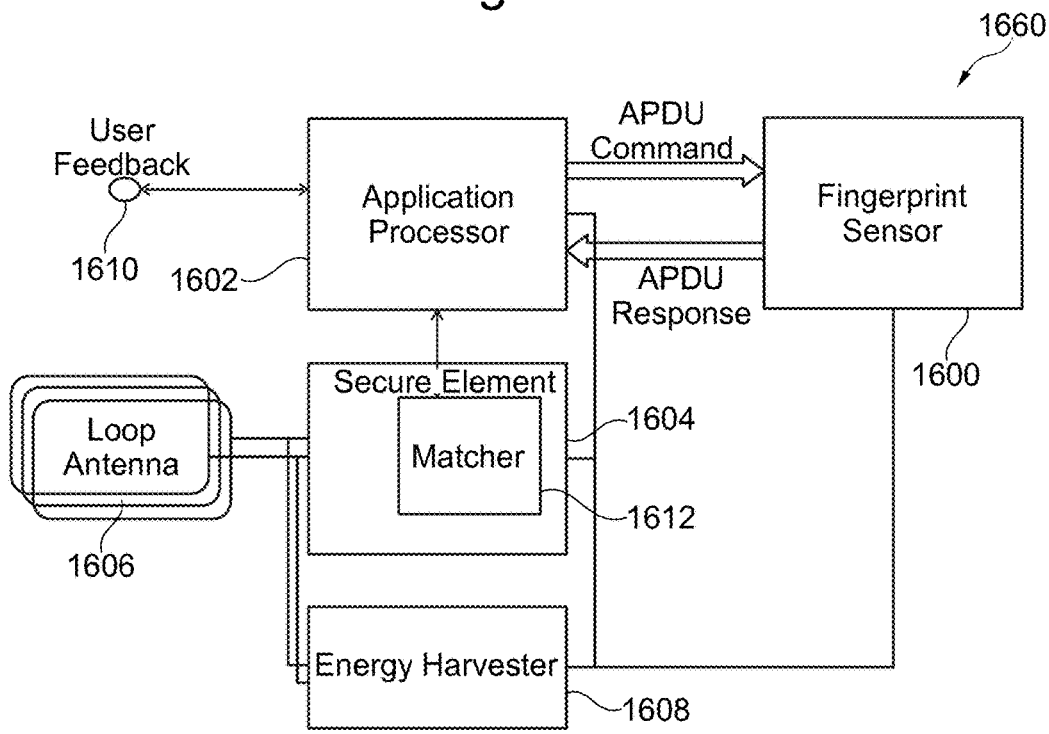
FIG. 16 illustrates in a schematic manner a biometric fingerprint system according to an embodiment of the present invention.

An embodiment of such fingerprint verification token is illustrated in FIG. 16. FIG. 16 illustrates an arrangement 1660 for fingerprint sensing/verification for example configured as a transponder or comprised in a transponder. The arrangement 1660 comprises a sensor system 1600, such as sensor system 700, 600, 500 illustrated in FIGS. 7, 6 and 5, respectively. Further, the arrangement 1660 comprises an application processor 1602, a secure element 1604, a loop antenna 1606 and an energy harvester 1608. Further, the arrangement 1660 comprises a user feedback, for example an LED 1610.

The illustration according to FIG. 16 depicts a contactless token which is completely powered by the reader filed via magnetic coupling involving the loop antenna and an energy harvester. Once the system is entered into the reader field and the system is powered, the secure element may request the application processor to execute fingerprint verification. The application processor may signal the request to the card holder by means of a user feedback 1610 device that may be a light emitting diode. The cardholder may then place his fingertip on the sensor area 1600. Under control of the application processor 1602 relevant areas comprising minutiae areas and ridge flow information areas are identified and fine-scanned and the captured data is provided to the application processor. In a consecutive extraction step the application processor may extract the features comprising minutiae and ridge flow information and return them for matching to the matcher 1612 comprised by the secure element 1604. The matching result may be utilized by a computer program being executed by the secure element. Said computer program may comprise a payment application, an authentication application and an identification application. This computer programs being executed by the secure element may communicate by the verification status in encrypted manner through the contactless communication interface to a host system that may be a contactless payment terminal (POS).

Figure 17:
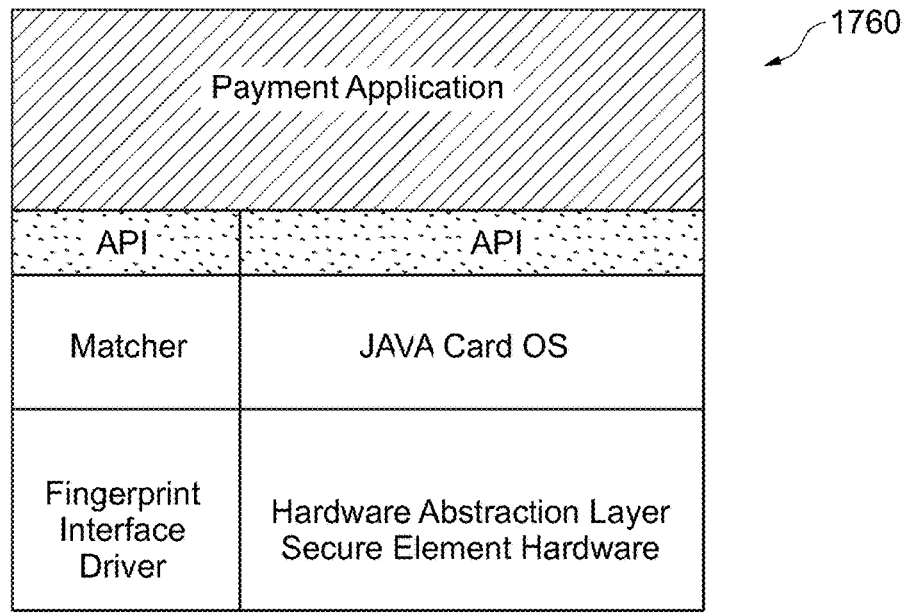
FIG. 17 illustrates in a schematic manner a system integration principle according to an embodiment of the present invention.
Figure 18:
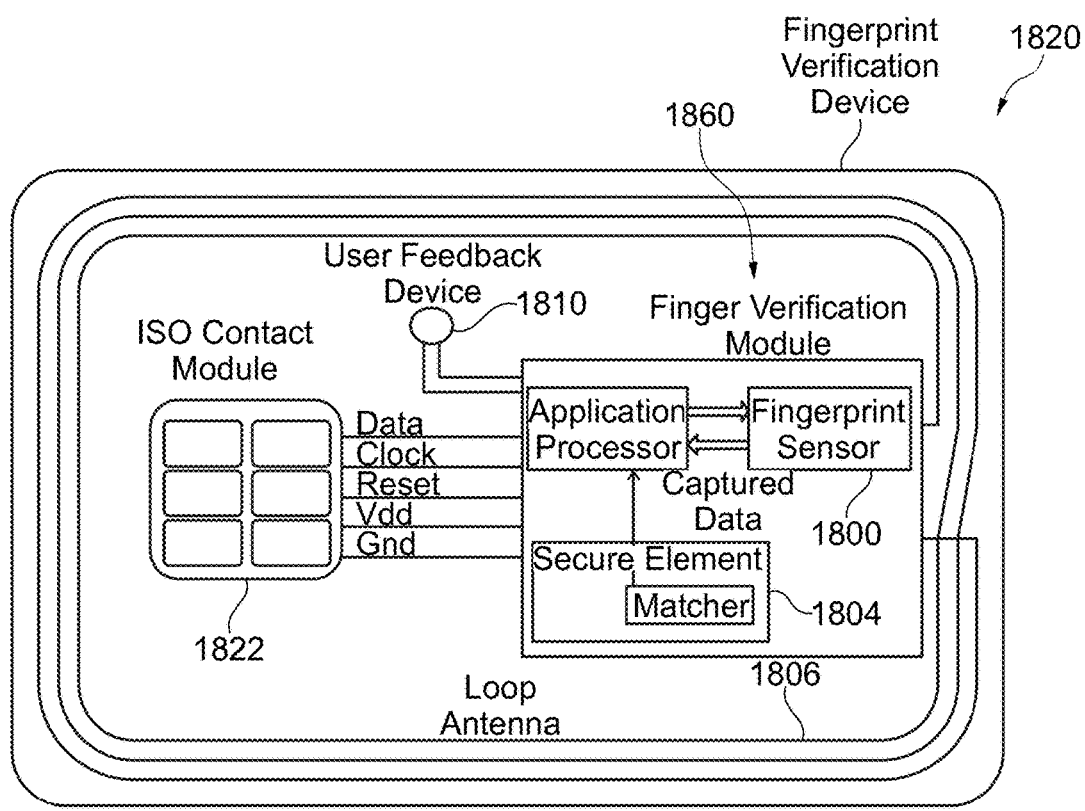
FIG. 18 illustrates in a schematic manner a card integration principle according to an embodiment of the present invention.

FIG. 17 illustrates an arrangement 1760 for fingerprint sensing/verification in a schematic integration diagram. The application processor may provide extracted feature information to the secure element. A fingerprint interface driver acts as interface between a feature matching device (Matcher) and the application processor. The Matcher matches life fingerprint features with reference fingerprint features being securely stored inside the Matcher. In one embodiment the matcher may have been configured to predefined PIN number to a payment application in terms of positive fingerprint verification and an error code in terms of negative verification. This approach may enable a standard payment application to interoperate with different authentication devices, fingerprint being one of them. This means, that a payment application may be developed, test, qualified and certified without a need to redesign or re-certify if one of the authentication devices may be changed against another. It is also feasible to run different authentication methods in parallel, if e.g. one of the authentication methods may fail. A safe fallback method may be a simple PIN-entry directly on a card as e.g. disclosed by EP2575084 (A1), FIG. 18 schematically illustrates an arrangement 1860 for fingerprint sensing/verification as configured in a transponder, in particular in a smartcard 1820. The smartcard 1820 comprises the arrangement 1860 for fingerprint sensing/verification, an ISO contact module 1822 and a loop antenna 1806 and further the user feedback 1810.

It is of an advantage if according to one embodiment illustrated in FIG. 18 the Fingerprint Sensor, the Application Controller and the Secure Element are integrated in one module component that has a minimal amount of external interfaces and may hence be easily assembled onto a smartcard inlay utilizing automated placement facilities. A second passive module provides just required electrical ISO contacts for compatibility with ATM machines. This embodiment provides dual-interface capability, i.e. it may work with contact readers (for providing backwards compatibility) and contactless readers (that may be contactless payment terminals) as well. A battery may not be required because the system may in contactless mode be powered by an energy harvesting function from the RF reader field. The module approach as disclosed here is a very cost efficient implementation of such fingerprint verification token.

The fingerprint verification system as disclosed here may well be suited for low-cost contactless banking and identification cards that must not be equipped with batteries.

The following features or advantages may be provided:
Integrated sensing and extraction
Pre scan for detecting minuitiae and ridge-flow areas and resulting data reduction
Fine scan of detected minutiae and ridge-flow areas
Switched-capacitor readout sensor system
Enrollment with card sensor (=differential system)
Resource sharing between enrolment and verification mode
Spatial resolution enhancement by two-dimensional weighted averaging
Manufacturing a fingerprint card by partitioning into one complex module and one passive module with minimal amount of interface signals between the two modules
fixed capacitor in feedback path
one gain stage for all sensor elements
improved PSRR by differential gain stage
compensate node capacitances by pre-charging
charge-amplifier approach

The invention claimed is:

1. Arrangement for fingerprint sensing/verification, comprising:
   a sensor system comprising plural sensor capacitors, each sensor capacitor including
   a central electrode
   a peripheral electrode annularly surrounding the central electrode and being connected to a ground potential; and
   a readout system adapted to selectively generate an output signal indicative of a capacity of each of the plural sensor capacitors, the readout system comprising a capacitance-to-voltage converter adapted to convert a capacity of each of the plural sensor capacitors to a voltage proportional to the capacity, the capacitance-to-voltage converter comprising a sample capacitor connectable to an output terminal of an operational amplifier to sample an output voltage of the readout capacitor, an analog-to-digital converter for converting the voltage of the sample capacitor to a numerical value, wherein the analog-to-digital converter has a non-linear conversion characteristic and wherein a reference voltage and/or capacity of a readout capacitor is computer controllable;
   wherein changes of the electric fields between each of the central electrode and the peripheral electrode of the plural sensor capacitors upon positioning a finger close to the sensor system is used to detect the fingerprint topology, wherein a change of the electric field changes a capacity of the respective sensor capacitor.

2. Arrangement according to claim 1, wherein the central electrode and/or the peripheral electrode comprises at least one recess and at least one protrusion being arranged such that the protrusion of one electrode extend into the recesses of the respective other electrode.

3. Arrangement according to claim 1, the capacitance-to-voltage converter comprising:
- an operational amplifier, in particular operational transconductance amplifier, having its non-inverting input terminal connected to ground potential or reference potential, wherein each of the sensor capacitors is selectively connectable to an inverting input terminal of the operational amplifier;
- a readout capacitor connected between the inverting input terminal of the operational amplifier and an output terminal of the operational amplifier; and
- a switching system adapted to selectively, in particular successively, convert the capacitance of one or more of the plural sensor capacitors to a respective voltage at the output terminal of the operational amplifier.

4. Arrangement according to claim 3,
wherein the switching system is adapted, in order to readout a particular sensor capacitor, while the finger is close to the sensor system:
to discharge the readout capacitor,
to connect the central electrode of the particular sensor capacitor to the inverting input terminal of the operation amplifier, until the voltage at the inverting input terminal is at ground potential or reference potential, in which case the output voltage at the output terminal of the operational amplifier is indicative of the capacitance of the particular sensor capacitor and thus indicative of the fingerprint in an area placed close to the particular sensor capacitor,
wherein the switching system is in particular further adapted,
to either charge the particular sensor capacitor by connecting it to a reference voltage before connecting the central electrode of the particular sensor capacitor to the inverting input terminal of the operation amplifier;
or to charge at least one parasitic capacitor with which a charge sharing occurs while connecting the central electrode of the particular sensor capacitor to the inverting input terminal of the operation amplifier.

5. Arrangement according to claim 1, further comprising:
a sensor system controller being adapted to control the sensor system, in order to detect fingerprint features in an overview area of the finger at a low resolution;
to identify, in the overview area, detail-rich sub areas, in particular including at least one ridge ending and/or ridge island and/or ridge bifurcation and/or ridge crossing and/or a ridge-flow feature;
to detect fingerprint features in the sub areas at a high resolution, the sum of the sizes of the sub areas in particular being between 20% and 50% of the size of the overview area.

6. Arrangement according to claim 5, further comprising:
a storage, in particular included in a secure element, for storing reference fingerprint data representing a fingerprint of an authorized user, in particular being obtained using the sensor system; and
a comparator, in particular included in a secure element, being adapted to compare the fingerprint features in at least one sub area against the reference fingerprint data; and
an indicator to support the capturing process.

7. Transponder, comprising:
an arrangement for fingerprint verification according to claim 1;
wherein the transponder is in particular powered by a reader field, in particular a contactless payment terminal.

8. Transponder according to claim 7, further comprising:
a secure element comprising storage for storing the reference fingerprint data and other private data.

9. Transponder according to claim 8, further comprising:
a power management adapted to
power down the secure element while the sensor system is detecting fingerprint features.

10. Method of fingerprint sensing/verification, comprising:
using a sensor system comprising plural sensor capacitors, each sensor capacitor including
a central electrode
a peripheral electrode annularly surrounding the central electrode and being connected to a ground potential; and
an image cache having a capacity of between 16 kB and 128 kB; the method comprising:
positioning a finger close to the sensor system, thereby changing electric fields between each of the central electrode and the peripheral electrode of the plural sensor capacitors;
detecting the changes in the electric fields thereby sensing the fingerprint in an overview area of the finger at a low resolution, and
identifying, in the overview area, detail-rich sub areas including at least one ridge ending and/or ridge island and/or ridge bifurcation and/or ridge crossing and/or a ridge-flow feature;
detecting fingerprint features in the sub areas at a high resolution, a sum of the sizes of the sub areas between 20% and 50% of a size of the overview area, wherein identifying the detail-rich sub areas comprises converting the low resolution representation into a frequency/wavelet domain and calculating a Haar wavelet transform and analyzing its frequency content, and
wherein a change of the electric field changes a capacity of the respective sensor capacitor.

* * * * *